United States Patent [19]
Young et al.

[11] Patent Number: 5,768,548
[45] Date of Patent: Jun. 16, 1998

[54] BUS BRIDGE FOR RESPONDING TO RECEIVED FIRST WRITE COMMAND BY STORING DATA AND FOR RESPONDING TO RECEIVED SECOND WRITE COMMAND BY TRANSFERRING THE STORED DATA

[75] Inventors: Bruce Young, Tigard; Norman Rasmussen, Hillsboro, both of Oreg.

[73] Assignee: Intel Corporation, Santa Clara, Calif.

[21] Appl. No.: 783,997

[22] Filed: Jan. 15, 1997

Related U.S. Application Data

[63] Continuation of Ser. No. 343,840, Nov. 23, 1994, abandoned, which is a continuation of Ser. No. 869,490, Apr. 15, 1992, abandoned.

[51] Int. Cl.$^6$ ............................................. G06F 13/42
[52] U.S. Cl. ............................................. 395/309
[58] Field of Search ............................. 395/306, 307, 395/308, 309, 310, 250, 800, 292, 427, 473, 520, 872, 873, 500

[56] References Cited

U.S. PATENT DOCUMENTS

| | | | |
|---|---|---|---|
| 4,148,011 | 4/1979 | McLagan et al. | 340/935 |
| 4,347,567 | 8/1982 | Detar, Jr. et al. | 395/481 |
| 4,410,942 | 10/1983 | Milligan et al. | 395/250 |
| 4,467,447 | 8/1984 | Takahashi et al. | 395/250 |
| 4,587,609 | 5/1986 | Boudreau et al. | 395/726 |
| 4,716,527 | 12/1987 | Graciotti | 395/500 |
| 4,719,569 | 1/1988 | Ludemann et al. | 395/729 |
| 4,763,249 | 8/1988 | Bomba et al. | 395/287 |
| 4,807,178 | 2/1989 | Fujiwara et al. | 395/872 |
| 5,117,486 | 5/1992 | Clark et al. | 395/250 |
| 5,167,022 | 11/1992 | Bahr et al. | 395/288 |
| 5,185,865 | 2/1993 | Pugh | 395/500 |
| 5,224,213 | 6/1993 | Dieffenderfer et al. | 395/250 |
| 5,265,211 | 11/1993 | Amini et al. | 395/856 |
| 5,269,005 | 12/1993 | Heil et al. | 395/869 |
| 5,274,784 | 12/1993 | Arimilli et al. | 395/306 |
| 5,333,276 | 7/1994 | Solari | 395/287 |
| 5,430,860 | 7/1995 | Capps, Jr. et al. | 395/482 |
| 5,434,997 | 7/1995 | Landry, et al. | 395/182.1 |

OTHER PUBLICATIONS

Digital Bus Handbook, Joseph Di Giacomo, 1990 USA.

*Primary Examiner*—Moustafa M. Meky
*Attorney, Agent, or Firm*—Blakely, Sokoloff, Taylor & Zafman

[57] ABSTRACT

A bus with bus commands which optimize the management of buffers within a bus bridge is disclosed. The bus incorporates at least two types of write commands, a Postable Memory Write command and a Memory Write command. The Postable Memory Write command serves as a write command which additionally instructs the bus bridge that the processor will not be informed that the data transfer is complete, and thus, data may be posted in the bus bridge. In contrast, the Memory Write command serves as a write command which additionally instructs the bus bridge that the processor may be informed that the data transfer is complete, and that data should not, accordingly, be posted. These two write commands are used in combination such that a data transfer of a contiguous block of data utilizes Postable Memory Write commands until the final transaction in the transfer, at which time, a Memory Write command is used. The bus further incorporates at least two types of read commands, including a Memory Read Prefetch command and a Memory Read command. The Memory Read Pre-fetch command serves as a read command which additionally instructs the bus bridge to pre-fetch a first amount of data. The Memory Read command serves as a read command which additionally instructs the bridge to pre-fetch a second amount of data, or in an alternative usage, to read the data without pre-fetching.

17 Claims, 4 Drawing Sheets

BUS BRIDGE FOR RESPONDING TO RECEIVED FIRST WRITE COMMAND BY STORING DATA AND FOR RESPONDING TO RECEIVED SECOND WRITE COMMAND BY TRANSFERRING THE STORED DATA

This is a continuation of application Ser. No. 08/343,840, filed Nov. 23, 1994, now abandoned, which is a continuation of application Ser. No. 07/869,490, filed Apr. 15, 1992 now abandoned.

BACKGROUND OF THE INVENTION

1. Field of the Invention

The present invention relates to the field of buses and bus bridges, and more particularly to a bus method and apparatus for optimizing the management of buffers within a bus bridge.

2. Art Background

In many computer systems, communications between a processor and main memory take place over a high performance memory bus. A number of systems additionally use a peripheral bus to which peripheral devices such as graphics systems, disk drives, or local area networks are coupled. In order to allow data transfers between the peripheral devices on the peripheral bus and modules on the main memory bus, a bus bridge is utilized to "bridge" or connect the two buses together.

The primary task of the bridge is to allow data to cross from one bus to the other bus without diminishing the performance of either bus. To perform this function, the bridge must understand and participate in the bus protocol of each of the buses. In particular, the bridge must be able to serve in both a slave capacity and a master capacity such that it can accept a request from a first bus as a slave, then initiate an appropriate bus operation on the other bus as a master. The bridge must, therefore, provide support for accesses crossing from one bus to the other.

Typically, a memory bus achieves a level of performance greater than that of a peripheral bus. As a result, read or a write operations from agents on the peripheral bus directed to memory address space on the higher performance memory bus will have a tendency to diminish the performance of the memory bus. One solution to this problem of diminished performance is to buffer data in the bridge to accomplish the data transfers more efficiently. In particular, posting data in a bridge buffer prior to writing the data into address space on the memory bus offers performance advantages, while pre-fetching data from address space on the memory bus in read operations also provides certain performance advantages. Posting data and pre-fetching data, however, can also result in unwanted data inconsistency and performance problems.

As will be described, the present invention resolves the problems associated with bridge buffering through the use of specialized bus commands on the peripheral bus. In particular, the present invention selectively uses specialized bus commands to assist the bridge in optimizing the management of buffering.

SUMMARY OF THE INVENTION

The present invention finds application in computer systems using a first bus, a second bus, and a bridge with a buffering capability coupling the two buses together. The bus of the present invention incorporates specialized bus commands to assist the bus bridge in the management of buffering between the two buses. In particular, the present invention selectively uses specialized bus commands to assist the bridge in optimizing the management of its buffering capability.

The bus of the present invention provides for at least two write commands, a Postable Memory Write command and a Memory Write command. The Postable Memory Write command is used to write data from the bus of the present invention to memory address space on the other bus. This command, however, additionally communicates to the bridge coupling the buses that the data to be written can be advantageously posted in the bridge until an efficient transfer over the other bus is possible. In contrast, the Memory Write command is used to write data from the bus of the present invention to memory address space on the other bus, but communicates to the bridge that any posting of data must be invisible to the master.

The present invention further provides a method for using the Postable Memory Write command and the Memory Write command in combination. Using this method, a contiguous block of data is transferred from the bus of the present invention to the other bus using Postable Memory Write commands until the final transaction, at which time, a Memory Write command is used. Accordingly, the bridge is instructed to optimize the transfer with posting until the final transaction, at which time, the bridge flushes the posted data and completes the write operation.

The bus of the present invention additionally provides for at least two read commands, a Memory Read Pre-fetch command and a Memory Read command. Two usages for these commands are disclosed. In a first usage, the Memory Read Pre-fetch command is used to read data from memory address space on the other bus, but also communicates to the bridge that it should pre-fetch additional sequential data. The amount of data pre-fetched may be interpreted to be a cache line or some other system dependent quantity. The second command, Memory Read, is used to read data from memory address space without an accompanying pre-fetch occurring. A system utilizing both of these commands can, thus, selectively pre-fetch data on certain read operations.

In a second usage, both the Memory Read Pre-fetch command and the Memory Read command cause the bridge to pre-fetch data. In particular, the Memory Read Pre-fetch command is reserved for particularly long burst reads of contiguous data, while the Memory Read command is reserved for shorter burst reads. The Memory Read Pre-fetch command can communicate to the bridge that the reading agent will be reading more than a full cache line, and thereby cause the bridge to pre-fetch a predetermined number of additional cache lines. In contrast, the Memory Read command can communicate to the bridge that the reading agent will be reading less than a full cache line, and thereby cause the bridge to pre-fetch one cache line of data. In this way, the present invention can also support variable length pre-fetching.

BRIEF DESCRIPTION OF THE DRAWINGS

Further details are explained below with the help of the examples illustrated in the attached drawings in which.

DETAILED DESCRIPTION OF THE INVENTION

A bus method and apparatus for optimizing the management of data within a bus bridge having a buffering capability is described. In the following description, for purposes of explanation, numerous details are set forth such as specific memory sizes, bandwidths, data paths, etc. in order to provide a thorough understanding of the present invention. However, it will be apparent to one skilled in the art that these specific details are not essential to the practice of the present invention. In particular, the present invention can readily be used in conjunction with a wide variety of buses, each bus having its own unique protocol, bandwidth, and data transfer characteristics. It is further noted that that well known electrical structures and circuits are shown in block diagram form in a number of figures in order not to obscure the present invention unnecessarily.

Figure 1:
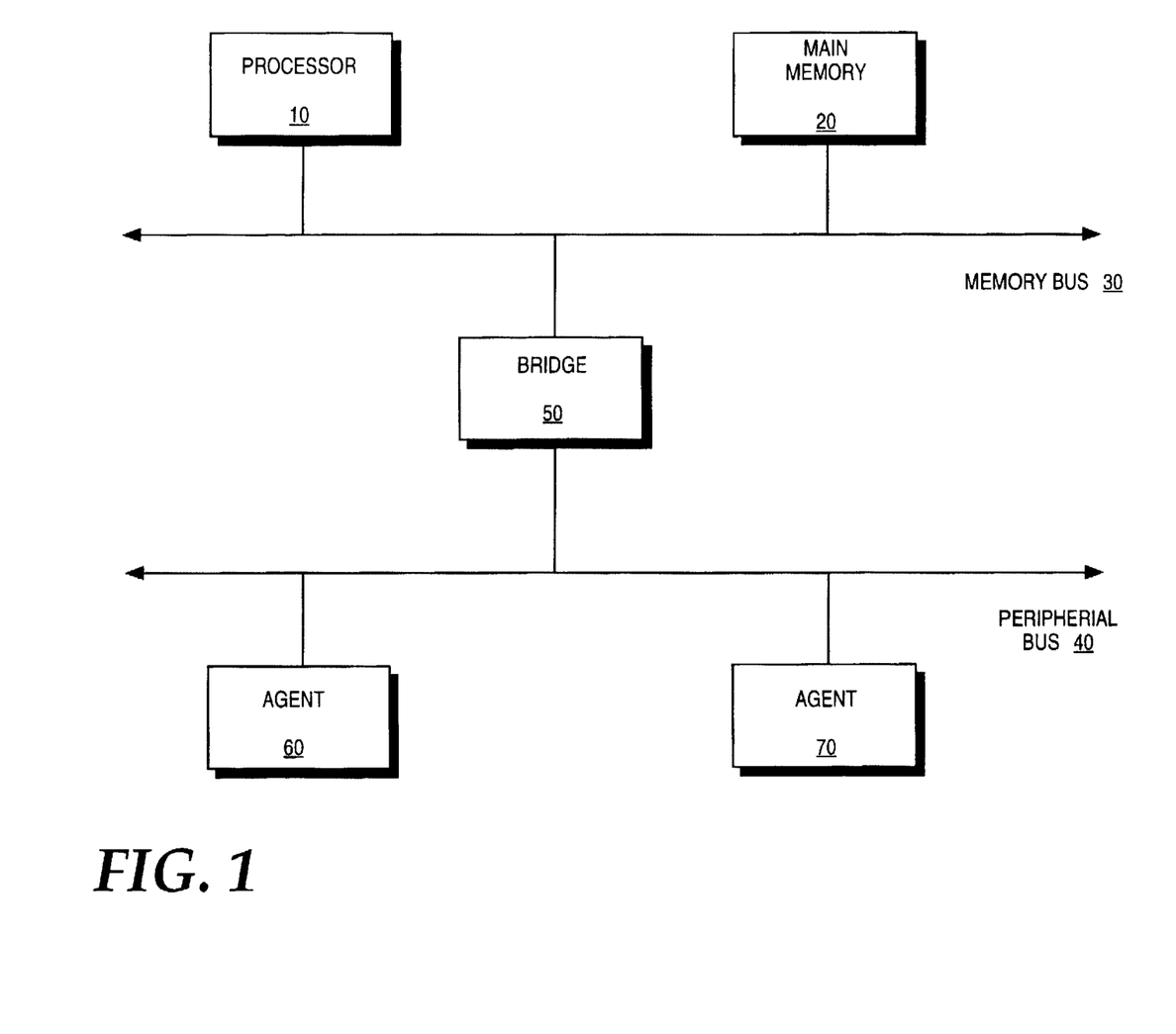
FIG. 1 illustrates a typical computer system having a memory bus and a peripheral bus coupled together using a bus bridge.

Referring now to FIG. 1, a computer system incorporating two buses is illustrated. In this system, a processor 10 and a main memory 20 are coupled to a memory bus 30. Memory bus 30 is advantageously designed for high performance to provide high bandwidth and low latency transfers between the processor 10 and main memory 20. To further enhance the performance of the system, the processor 10 can include a cache memory (not shown), and main memory 20 can store data in cache lines (not shown). A second bus, the peripheral bus 40, serves as a local bus for peripheral devices such as disk drives, network interconnects, or graphics subsystems (collectively referred to as "agents"). Two such peripheral devices, denoted agent 60 and agent 70, are shown in FIG. 1 coupled to peripheral bus 40.

Memory bus 30 and peripheral bus 40 are coupled together through a bus bridge 50. In the system illustrated in FIG. 1, the basic task of the bridge 50 is to couple memory bus 30 and peripheral bus 40 together to provide a mechanism for requests that originate on one of the buses to be passed to a destination on the other bus. To perform this function, the bridge 50 must understand and participate in the bus protocol of each of the buses 30 and 40. In particular, the bridge 50 must be able to serve in both a slave capacity and a master capacity, such that it can accept a request from a first bus as a slave, then initiate an appropriate bus operation on the other bus as a master.

There are two primary operations which the bridge 50 must support. First, the bridge 50 must support accesses from a module on the memory bus 30, directed to an agent on the peripheral bus 40. These accesses necessarily route data through bridge 50. Second, the bridge 50 must support accesses from an agent on the peripheral bus 40 to a module on the memory bus 30, for example, main memory 20. Again, these accesses necessarily route data through bridge 50. In each of these operations, the bridge 50 must convert data from a first bus protocol to a second bus protocol, and not cause incoherency or deadlock conditions to occur. Ideally, the bridge 50 allows memory bus 30 to operate completely independently of peripheral bus 40. In the event that the processor 10 is required to access an agent on the peripheral bus 40, the processor 10 simply accesses the bridge 50 on memory bus 30. It is then the responsibility of bridge 50 to actively engage peripheral bus 40.

The design of bridge 50 can range from a simple protocol converter which can be implemented in PAL technology to a complicated highly tuned device which requires an ASIC or custom design capability. Alternatively, depending on the cost and complexity the designer is willing to incur to provide a specific level of functionality, the design can cover any performance point between these two extremes. Any design for bridge 50 must consider that a read or a write operation directed from an agent on one bus, such as peripheral bus 40, through bridge 50, to a module on a higher performance bus, such as memory bus 30, will tend to disrupt and diminish the performance of the higher performance bus. This design consideration can be understood through the following examples described below.

In a first example, assume memory bus 30 is a high performance bus that is eight bytes wide, providing for the transfer of 8 bytes at a time, while the peripheral bus 40 is only one byte wide, providing for the transfer of one byte at a time. Assume further, that agent 60 wishes to write data into main memory 20. In a simple bridge design, the data would be passed one byte at a time, across the peripheral bus 40, through the bridge 50, across memory bus 30, into main memory 20. Under this scenario, a full seven byte lanes, or seven-eighths of the bandwidth of memory bus 30 would be wasted as the data is slowly passed across a bus with considerably greater bandwidth. Thus, assuming the write operation transferred a total of one megabyte of data from agent 60 into main memory 20, the operation would effectively waste seven megabytes worth of bandwidth on memory bus 40. In addition, bridge 50 would repeatedly disrupt the traffic on memory bus 30 to accomplish this piecemeal transfer.

In a second example, assume the same bus characteristics, but assume that agent 60 wishes to read data from main memory 20. If agent 60 proceeds to read data from main memory 20 one byte at a time through bridge 50, the bandwidth of memory bus 30 will again be wasted. Again, traffic on memory bus 30 will be measurably disrupted by this read operation. As will now be described, one possible solution to these problems lies in the incorporation and utilization of buffers within bridge 50.

Figure 2:
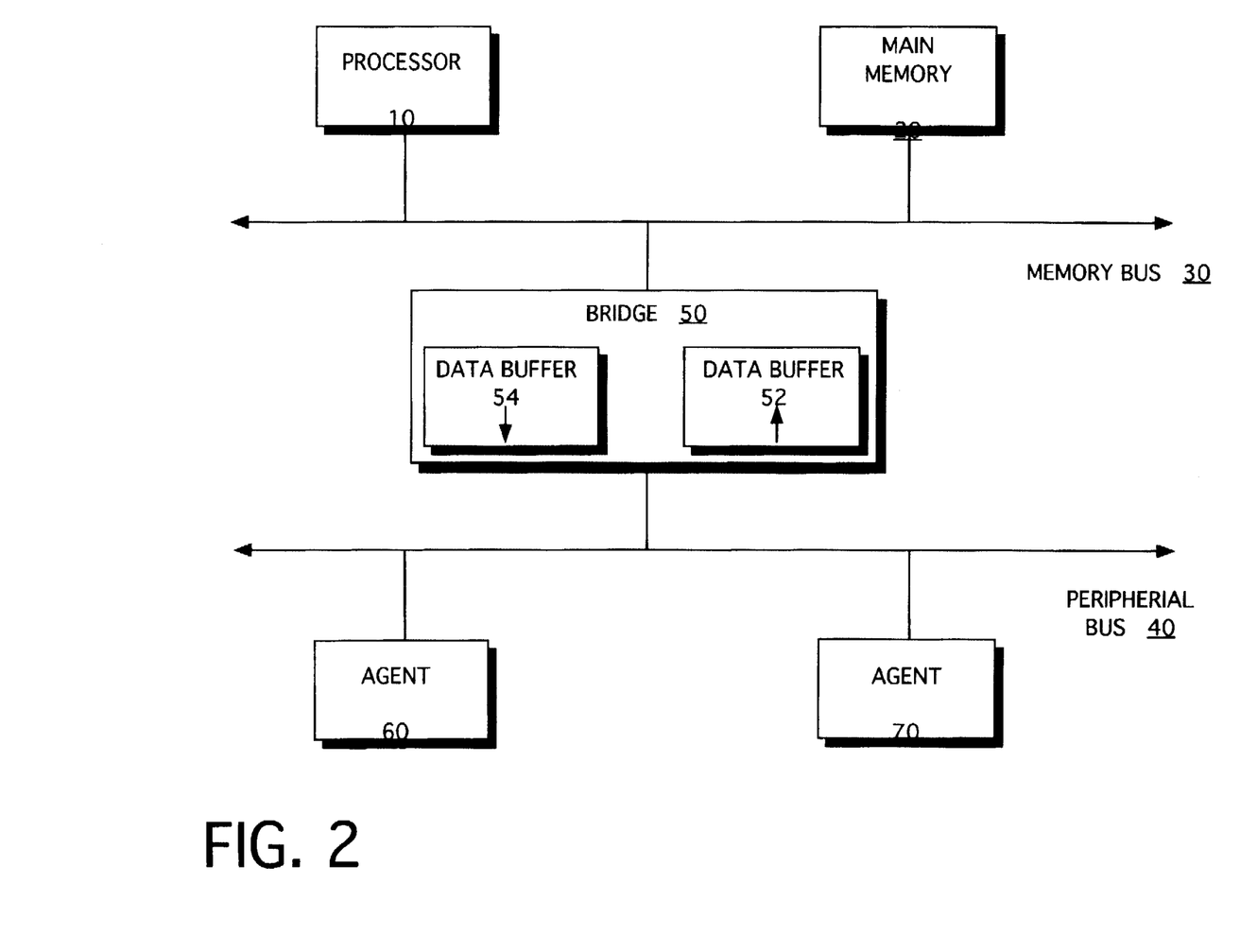
FIG. 2 illustrates this computer system with the addition of buffering within the bus bridge.

Referring now to FIG. 2, this figure illustrates the same system as shown in FIG. 1 with the addition of two data buffers within bridge 50. In particular, as illustrated in this figure, bridge 50 includes data buffer 52 and data buffer 54. Data buffer 52 is used in write operations originating from the peripheral bus 40 and directed to main memory 20 to advantageously store or "post" data until an efficient transfer over memory bus 30 can be accomplished. For example, if agent 60 wishes to write one megabyte of data into main memory 20, rather than transfer this data one byte at a time through bridge 50, across the memory bus 30, into main memory 20, the data can initially be posted in data buffer 52, and thereafter transferred efficiently over memory bus 30.

Accordingly, the use of data buffer 52 entails initially coupling several bytes of data to bridge 50, temporarily storing the data in data buffer 52, with bridge 50 requesting control of memory bus 30 when it is advantageous to do so. Assuming again, that memory bus 30 is eight bytes wide, the bridge 50 can wait until it accumulates at least eight bytes of data in data buffer 52 before requesting access to memory bus 30. After being granted access, bridge 50 can transfer the data efficiently in an eight byte packet. This process of prepackaging data is referred to as "packetizing," and readily exploits the fact that I/O transfers from agents on the peripheral bus 40 typically take place in contiguous data blocks. Packetizing can thus reduce the amount of wasted bandwidth and minimize disruptions on memory bus 30.

Data buffer 54 can also be used to buffer data in read operations originating from an agent on the peripheral bus 40 and directed to main memory 20. As previously described, if agent 60 wishes to read data from main memory 20, and the bridge 50 reads data out of main memory 20 one byte at a time, such a piecemeal read operation is detrimental to the performance memory bus 30. With a buffering capability, however, the bridge 50 can advantageously assume that agent 60 ultimately intends to read a series of contiguous bytes from main memory 20. Operating under this assumption, the bridge 50 can respond to the first read request for one byte by reading from main memory 120 this byte of data, as well as the next seven contiguous bytes. This "pre-fetch" of the next seven contiguous bytes of data takes advantage of the bandwidth of memory bus 30, and in most systems, incurs a minimal additional performance cost. The additional bytes are then stored in data buffer 54. Thereafter, when agent 60, as predicted, requests a read of the next sequential byte of data from main memory 20, this subsequent request can be processed within bridge 50 without the need to disrupt traffic on the memory bus 30. Additionally, this sequential read can be satisfied in fewer clock cycles because the data is stored locally in data buffer 54, thereby reducing latency on the peripheral bus 40.

Although buffering can provide substantial performance benefits, certain functional issues arise. Focussing first on the posting of data in a write operation from an agent on peripheral bus 40, a coherency problem occurs if the status and extent of the posting in data buffer 52 is not "understood" by the system. In particular, if the processor 10 assumes that the write transfer into main memory 20 is complete, and proceeds to access what it assumes is "fresh" data, when in actuality the data is still posted in data buffer 52, the processor 10 will improperly be accessing "stale" data. One solution to this problem is to have the bridge 50 participate in the cache coherency protocol of memory bus 30. This solution, however, forces a high level of the complexity onto the bridge 50 and tends to be expensive. A second possible solution is to use software to flush data buffer 52 regularly to prevent the possibility of incoherency. This solution, however, sacrifices overall performance.

Turning now to the buffering of data in read operations, pre-fetch operations can actually have the unwanted side effect of needlessly consuming bandwidth on memory bus 30. It will be appreciated that a system which always pre-fetches data does so in the hopes that the next block of data will be needed by an agent coupled to the peripheral bus 40. However, on those occasions when the next block of data is actually not needed, it will be appreciated that the pre-fetch operation has diminished the performance of the system by accessing unneeded data from main memory 20. Moreover, in a system having read bursts of potentially unlimited duration, the bridge 50 has no way of understanding how much data to pre-fetch. In response to these problems, many systems simply choose not to conduct pre-fetch operations.

Figure 3:
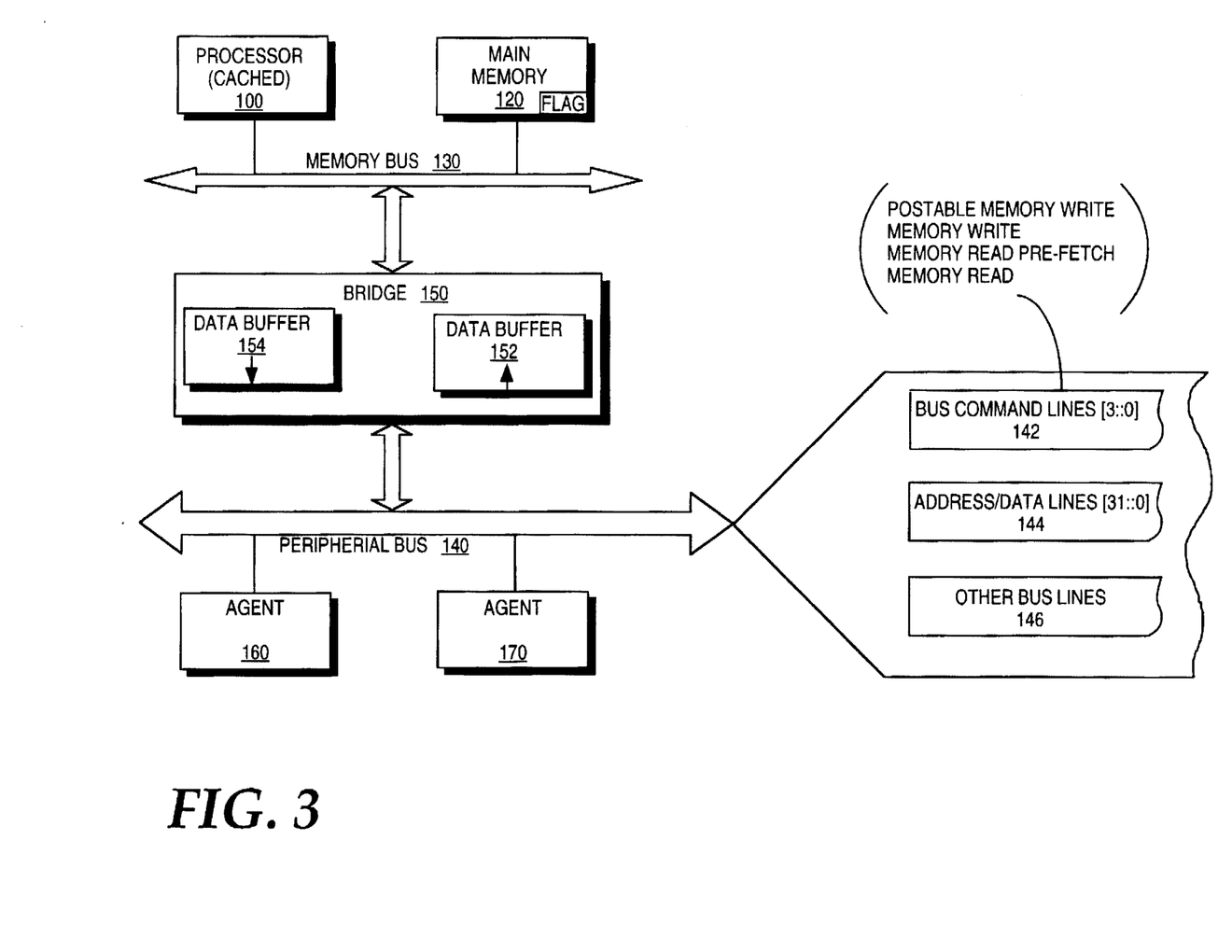
FIG. 3 illustrates the peripheral bus with bus lines and bus commands of the present invention.

As will be described, the present invention resolves the aforementioned problems through the selective use of bus commands encoded on bus command lines of a peripheral bus. Referring now to FIG. 3, a peripheral bus incorporating bus command lines and bus commands in accordance with the present invention is illustrated. As shown in this figure, a processor 100 (cached) and a main memory 120 are coupled to a memory bus 130. A bridge 150 having a first data buffer 152, and a second data buffer 154, serves to couple memory bus 130 to a peripheral bus 140. The peripheral bus 140, to which agent 160 and 170 are coupled, includes bus command lines 142, multiplexed address/data lines 144, and the other bus lines 146. A description of the functioning of the multiplexed address/data lines 144 as well as the other bus lines 146, not essential to an understanding of the the present invention, can be found in the copending patent application entitled "A Signaling Protocol For A Peripheral Component Interconnect," Ser. No. 08/799,526, filed Feb. 12, 1997, still pending which is herein incorporated fully by reference.

As will be described, the present invention utilizes bus commands on peripheral bus 140, selectively coupled to bus command lines 142, to optimize the management of data buffer 152 and data buffer 154 by bridge 150. In particular, two commands, a "Postable Memory Write" command and a "Memory Write" command, are selectively utilized in write operations from an agent on the peripheral bus 140 to memory address space such as main memory 120. In addition, two bus commands, a "Memory Read Pre-fetch" and a "Memory Read" are selectively used in read operations from an agent on the peripheral bus 140 to memory address space such as main memory 120. The present invention's use of Postable Memory Write commands and Memory Write commands will first be described.

Continuing to refer to FIG. 3, this figure illustrates a data buffer 152 within bridge 150. Data buffer 152 buffers data which is to be written from an agent on peripheral bus 140 to main memory 120. As was previously discussed, posting data in this fashion can create a coherency problem wherein the processor 100 mistakenly assumes that it is accessing fresh data in main memory 120. The present invention's use of specialized bus commands on peripheral bus 140 reflects an understanding that this coherency problem occurs only when the processor 100 is "misinformed" that the transfer is complete, when in fact, the data is still posted in data buffer 152. In general, there are three ways in which the processor 100 can be informed that data has been successfully written from an agent, for example, agent 170, into main memory 120. First, agent 170 can write a flag in a memory system such as main memory 120 indicating that the data transfer is complete, and the processor 100 can thereafter read this flag. Second a agent 170 can set a bit in a status register within agent 170 indicating that the data transfer is complete, and the processor 100 can thereafter read this status register. Third, agent 170 can issue an interrupt signal to processor 100 which directly tells the processor 100 that the data transfer is complete. The present invention recognizes that each of these methods necessarily involves action on the part of the writing agent on the peripheral bus, in this example, agent 170. Thus, preventing the aforementioned coherency problem requires the writing agent on the peripheral bus to wait until it can actually guarantee that the data transfer is complete, i.e. that the data is actually in main memory 120, before it informs the processor 100.

In accordance with this recognition, the present invention utilizes two different write commands on the peripheral bus 140, the Memory Write command, and the Postable Memory Write command. The Memory Write command is used by an agent on peripheral bus 140 to write data into memory address space such as main memory 120. This command, however, additionally communicates to the bridge 150 that in response to an acknowledge signal from the the bridge 150, the writing agent may inform the processor 100 that the data transfer is complete. Thus, to insure coherency, the bridge 150 can respond to a Memory Write command in one of at least two ways. The bridge 150 can accept the data and not issue an acknowledge signal to the writing agent until the data has actually been written into main memory 120. In the alternative, the bridge 150 can post the data, issue an acknowledge signal, then selectively prevent or delay all signalling between the writing agent and the processor 100 until it completes the data transfer.

In contrast to the Memory Write command, the Postable Memory Write command is a write command which additionally communicates to the bridge 150 that in response to an acknowledge signal from the bridge 150, the writing agent will not inform the processor 100 that the data transfer is completed. Thus, when the bridge 150 receives this command, it understands that the posting of data in data buffer 152 is acceptable.

In response to a Postable Memory Write command, the bridge 150 accepts the data, posts the data in data buffer 152, and issues an acknowledge signal. In response to this acknowledge signal, the writing agent does not inform the processor 100 that the transfer is complete, but instead, assumes that the data is actually being posted in bridge 150. The bridge 150 can then accumulate and assemble the data into a cache line in data buffer 152, then proceed to request access to memory bus 130, or alternatively, continue to post data until the memory bus 130 is free, then arbitrate for access of memory bus 130. A number of other bridge strategies for maximizing the efficiency of the transfer over memory bus 130 are possible. As long as the bridge 150 continues to receive Postable Memory Write commands, coherency issues will not arise. It is not until an agent issues a Memory Write command, and the bridge 150 acknowledges this command, as previously described, that a coherency issue potentially arises.

In the present invention, the Postable Memory Write command and the Memory Write command are advantageously used in combination to optimize the management of buffering in bridge 150. In particular, according to a first method, when an agent on the peripheral bus 140 wishes to write a block of data into main memory 120, it uses a series of Postable Memory Write commands until the final transfer, at which time, the writing agent uses a Memory Write command. In response to the series of Postable Memory Write commands, the bridge 150 posts the data in data buffer 152, and proceeds to transfer the data over memory bus 130 into main memory 120 as efficiently as possible. However, in response to the concluding Memory Write command, the bridge 150 delays this concluding Memory Write by inserting wait states or "backing off" the access, flushes all the posted data out of data buffer 152, accepts the Memory Write data, and returns an acknowledge signal to the writing agent only after the data is written into main memory 120. Accordingly, in the present invention, a writing agent can continue to send data using the Postable Memory Write command until the final transaction. The writing agent, by selectively using the bus commands of the present invention, thereby allows the bridge 150 to efficiently post data until the final transaction.

This method of operation can perhaps best be understood through reference to the following example. Referring to FIG. 3, assume agent 170 on the peripheral bus 140 wishes to write a 1K block of data into main memory 120. Assume further, that memory bus 130 allows for the transfer of eight bytes at a time, while peripheral bus 140 allows for the transfer of only one byte at a time. In the present invention, data would be transferred from agent 170 into bridge 150, one byte at a time in 1,023 accesses. All of these accesses would be conducted as Postable Memory Writes, thereby allowing the bridge 150 to post the data efficiently in data buffer 152. The last access (number 1,024), however, would be done with a Memory Write command. In the event that the bridge 150 still had data posted in data buffer 152, the bridge 150 would initially not acknowledge this concluding Memory Write command. The bridge 150 would first flush data buffer 152, after which time, the Memory Write data would be accepted without posting, the data written into main memory 120, and the acknowledge signal issued.

If the system utilizes a flag within main memory 120 to inform the processor 100 that a data transfer is complete, the previously described concluding Memory Write command can be written to the location of the flag in main memory 120. The Postable Memory Write commands are used for all of the actual data to be transferred, while a concluding Memory Write command is simply directed to the location of the flag in main memory 120. It will be appreciated that most of the write operations from agents coupled to peripheral bus 140 will constitute write operations of contiguous blocks of data. For example, if agent 170 were a disk drive writing to main memory 120, it would typically write data in 256 to 4K blocks. Thus, a method of operation wherein a series of Postable Memory Write commands is used until the final transaction, whereupon a Memory Write command is used, is well suited to a peripheral bus environment.

Continuing to refer to FIG. 3, the present invention's use of the Memory Read Pre-fetch command and the Memory Read command will now be described. As shown, FIG. 3 illustrates a data buffer 154 within bridge 150. Data buffer 154 buffers data that is to be read from main memory 120 by an agent on peripheral bus 140. As was previously discussed, pre-fetching and buffering data in this fashion can create a problem when the bridge 150 lacks accurate information on when, and how much data to pre-fetch data for a given read operation. If the bridge 150 pre-fetches at inappropriate times, or in inappropriate quantities, the performance of memory bus 130 can be diminished. The present invention resolves this problem by providing two types of read commands, a Memory Read Pre-Fetch command and a Memory Read command, both of which are encoded on bus command lines 142 of peripheral bus 140. Two usages for these commands will be described.

In a first usage, with a Memory Read Pre-fetch command, an agent on the peripheral bus 140 requests a read operation of memory address space, for example main memory 120, but by using this command, also communicates to the bridge 150 that it should pre-fetch additional sequential data. The Memory Read Pre-fetch command is used by an agent on the peripheral bus 140 whenever a pre-fetch operation by the bridge 150 would be advantageous to system performance. The second command, Memory Read, is used to read data from memory address space without an accompanying pre-fetch occurring. This command is used under circumstances where a Memory Read Pre-fetch would not enhance system performance. A system utilizing both of these commands can thus selectively pre-fetch data on certain read operations.

In a system with a master agent 160 using burst reads, the Memory Read Pre-fetch command is used to communicate to the bridge 150 that a stream of contiguous reads is going to be done, either within the present burst, or in combination with a following burst. The command can optionally communicate this contiguous read information as a firm indication or a hint. When this command amounts to a firm indication, the Memory Read Pre-fetch command causes the bridge 150 to immediately acquire the next sequential data. The amount of data pre-fetched may be interpreted to be a cache line or some other system dependent quantity. Thus, when the reading agent requests the next data, the pre-fetched data is already present in the bridge 150. To make efficient use of this command in this fashion, reading agents on the peripheral bus 140 should have knowledge of the cache line size of the system. This information can be programmed into a configuration register in each agent. Alternatively, the agents may use a reasonable guess of the cache line. Guessing the wrong size will have a minimal impact of system performance.

When the command is essentially a hint, the Memory Read Pre-fetch command simply provides a hint to the bridge 150 that a contiguous read will likely take place. This command still causes the bridge 150 to additionally pre-fetch the next data, a cache line. However, because this is a hint and not a guarantee, a control unit in bridge 150 must determine how long to keep this data in data buffer 154. This usage effectively amounts to using data buffer 154 as a simple cache.

In a second usage, assuming a data buffer 154 of sufficient capacity, the Memory Read Pre-fetch command is reserved for particularly long burst reads of contiguous data. For example, the command communicates to the bridge 150 that the reading agent will be reading more than a full cache line, and that the bridge 150 should pre-fetch a predetermined number of additional cache lines. The command, thus, informs the bridge 150 that this read is going to be a long burst rather than a short burst, and the bridge 150 responds by pre-fetching a predetermined number of additional cache lines. Typically, once the performance penalty is paid in accessing main memory 120, a small additional penalty is paid for accessing multiple cache lines. In response to the Memory Read Pre-fetch command in this usage, the bridge 150 can optionally wait until memory bus 130 is free, then arbitrate for the memory bus 130, requesting the predetermined number of additional cache lines.

In this usage, the Memory Read command, contrary to its usage in the previous discussion, is also used to communicate to the bridge 150 that a pre-fetch operation should be undertaken with the read. Thus, two read commands for pre-fetching data are used. The Memory Read command is used to get the most logical amount of data, for example, one width, or one cache line of data. For example, whenever the burst read is shorter than a cache line, the Memory Read indicates to the bridge 150 that it should pre-fetch a full cache line of data. On the other hand, the Memory Read Pre-fetch command is used whenever the burst read is going to be longer than one cache line of data, and causes the bridge 150 to additionally pre-fetch the next cache line of data as well. In this way, the present invention can support variable length pre-fetching, with Memory Read Pre-fetch commands causing the bridge 150 to consistently stay one cache line ahead of each burst read.

While the preceding discussion has focussed on particular applications for specialized write and read commands for the management of bridge buffering, it will be appreciated that the principle of using bus commands on a peripheral bus to optimize the management of bridge buffering can be extended to encompass numerous alternative commands or alternative usage rules. In particular, with respect to providing commands to optimize pre-fetching, a potentially unlimited number of different read commands can be used to specifically communicate to the bridge precisely how much data to pre-fetch. With respect to write commands, specialized write commands can be used to specify how much data to post in the buffers, and/or a predetermined period of time in which the data should be posted. At the conclusion of this predetermined period of time, the bridge flushes the buffer, and the writing agent informs the processor of the completed transfer.

In addition, it will be appreciated that the present invention can be utilized in a system in which the bridge is not designed to distinguish between a Memory Write and a Postable Memory Write, or a Memory Read and Memory Read Pre-fetch. The system would interpret the commands from the peripheral bus of the present invention accordingly, treating all writes in a similar fashion and/or all reads in a similar fashion. Such a system would function adequately but not take advantage of the information provided by the present invention.

Referring now to Table 1 below, this table provides a listing of the command set in the peripheral bus of the present invention. These commands are encoded on bus command lines 142 shown in FIG. 3 which comprise 4 separate lines [3::0]. In this particular embodiment, the four lines are multiplexed such that during an address phase of a bus transaction, the lines are encoded with the bus command, while during a data phase of the bus transaction, the lines are used as Byte Enables which determine which byte lanes carry meaningful data.

TABLE 1

| BUS COMMANDS | |
|---|---|
| [3210] | |
| 0000 | Interrupt Acknowledge |
| 0001 | Special Cycle |
| 0010 | I/O Read |
| 0011 | I/O Write |
| 0100 | Reserved |
| 0101 | Reserved |
| 0110 | Memory Read |
| 0111 | Memory Write |
| 1000 | Reserved |
| 1001 | Reserved |
| 1010 | Configuration Read |
| 1011 | Configuration Write |
| 1100 | Reserved |
| 1101 | Memory Write and Invalidate |
| 1110 | Memory Read Pre-fetch |
| 1111 | Postable Memory Write |

It can be noted from Table 1, that the encoding difference between the Postable Memory Write command (1111) and the Memory Write command (0111) represents a single bit. Similarly, the difference between the Memory Read Pre-fetch (1110) and the Memory Read (0110) is also a single bit. These single bit differences can be chosen to allow some devices to which the buffer related communications would be meaningless, for example agents coupled to the peripheral bus 140 when serving as slaves, to only sample the first three bits. The first three bits indicate either a read or a write, while the fourth bit essentially provides information for bridge buffer management.

Briefly describing the other bus commands shown in Table 1, these commands include: an Interrupt Acknowledge command which is a read implicitly addressed to the system interrupt controller, a Special Cycle command used to transmit information from one agent to one or more other agents on the peripheral bus, an I/O Read command used to read data from an agent mapped in I/O address space, an I/O Write command used to write data to an agent mapped in I/O address space, a Configuration Read command used to read the configuration space of each agent, a Configuration Write command used to transfer data to the configuration space of each agent, and a Memory Write and Invalidate command. The Memory Write and Invalidate command is used to write data to an agent mapped in memory address space. This command is used when the master intends to transfer all bytes in the addressed cache line in a single transaction. (every byte enable for the entire transaction is asserted). The master cannot allow the transaction to cross a line boundary unless it intends to transfer the entire next line also. (Same meaning applies to both lines, all byte enables are asserted.) This is an optional command and requires a configuration register in the master indicating the cache line size. The intent of this command is to facilitate copyback cache coherence operations. A target that does not utilize this optimization would treat this command like a Postable Memory Write.

Figure 4:
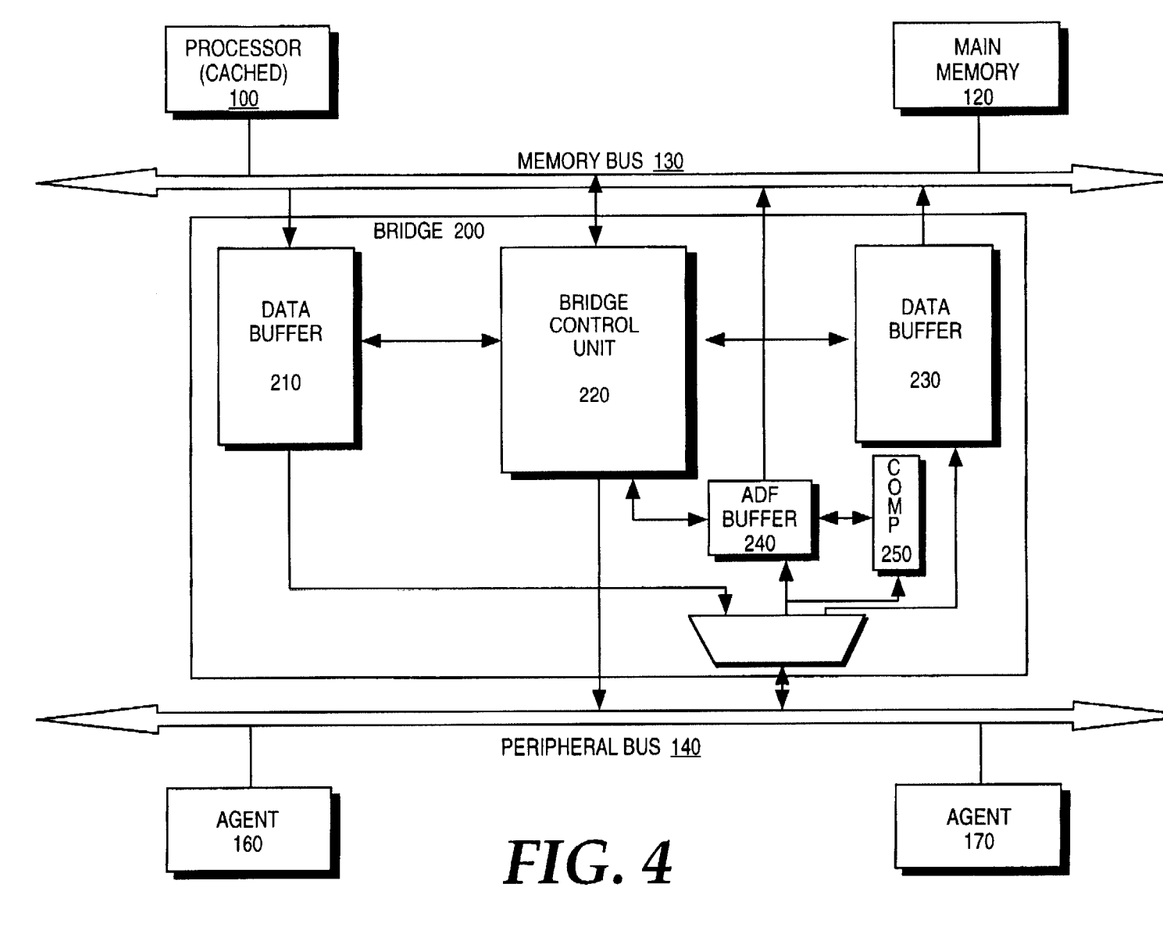
FIG. 4 illustrates, in block diagram form, the design of a bus bridge which incorporates the bus commands of the present invention.

Referring now to FIG. 4, this figure illustrates in block diagram form, the design of a bridge 200 which can be used in conjunction with the present invention. The bridge 200 includes a data buffer 210 for buffering data in response to Read Pre-Fetch commands, a data buffer 230 for posting data in response to Postable Memory Write commands, an address buffer 240 for buffering addresses coupled to the bridge 200, and a bridge control unit 220. The bridge control unit 220 comprises state machine control logic which serves to control the functioning of the bridge 200 in response to commands from the peripheral bus 140 or the memory bus 130. In particular, bridge control unit 220 determines whether and when data will be accepted by the bridge 200, and whether and when access on a particular bus will be arbitrated. Bridge control unit 220, therefore, includes protocol control units for memory bus 130 and peripheral bus 140. The address buffer 240, in a first embodiment, sequentially stores an address for each piece of data that is to be written or read. The address buffer 240, in an alternative embodiment, stores the first address in a block of data, and thereafter, uses a comparator 250 to determine whether the next access is addressed to the next sequential address.

In response to a Memory Write command from an agent on peripheral bus 140, bridge control unit 220 will not acknowledge or hand shake with the writing agent until the data is actually written into main memory 120. Thus, the bridge control unit 220 will provide the address to the address buffer 240, and the data to the data buffer 230, and arbitrate for control of memory bus 130 to transfer the Memory Write data into main memory 120. When the bridge control unit 220 successfully gains control of memory bus 130 and completes the transaction, bridge control unit 220 will then issue an acknowledge signal on peripheral bus 140. Thus, in a Memory Write operation, the data buffer 230 functions like a simple register.

In response to a Postable Memory Write command, the bridge control unit 220 initially places the address in address buffer 240 and the data in data buffer 230, but does not then attempt to gain control of memory bus 130. Instead, the bridge control unit 220 posts the data. When the next write command is received, the bridge control unit 220 must determine whether this command is a Postable Memory Write or a Memory Write. If it is a Memory Write command, bridge control logic 220 holds off the command by inserting wait states, flushes data buffer 230 by writing all posted data to main memory 120, accepts the Memory Write data, and transfers the Memory Write data into main memory 120, before issuing an acknowledge signal on peripheral bus 140.

On the other hand, if the command is a Postable Memory Write command, the bridge control unit 220 must determine whether this piece of data is addressed to the next sequential address. If it is, the data is posted in data buffer 230, and the posting process continues indefinitely in this fashion until a full cache line of data is posted in data buffer 230. At this point, the bridge control unit 220 arbitrates for control of the memory bus 130, and proceeds to transfer the data over memory bus 130 in an efficient fashion.

The bridge control unit 220 responds to a Memory Read command by similarly coupling the address from the peripheral bus to the address buffer 240, and thereafter, arbitrates for control of memory bus 130. When granted access, the bridge control unit 220 couples the read data to data buffer 210, and subsequently provides the data to the reading agent. Thus, in a Memory Read operation, data buffer 210 functions like a simple register.

On the other hand, if the command is a Memory Read Pre-fetch command from requesting agent 170, the bridge control unit 220 places the address in the address buffer 240 and arbitrates for control of memory bus 130. When granted access, the bridge control unit 220 reads two full cache lines of data into the data buffer 210 and provides the requested data to the requesting agent 170. As the burst continues, the bridge control unit 220 must determine if the requested data is available in the data buffer 210. If it is, it can be provided to the requesting agent 170 quickly. If the requesting agent 170 continues to request sequential data using a Memory Read Pre-fetch command and continues into the second cache line, the bridge control unit 220 will arbitrate for the memory bus 130 and read the third sequential cache line and place it into the data buffer 210. This will continue until the bridge 200 receives a bus command that is not a Memory Read Pre-fetch or the bridge control unit 220 determines that the requested data is not sequential. At that time the bridge control unit 220 will invalidate the data in the buffer 210 and get the required data from main memory 120.

Thus, the present invention provides for a peripheral bus with bus commands for optimizing the management of buffering within a bus bridge. In particular, the present invention provides for the selective use of a Postable Memory Write command, a Memory Write command, a Memory Read Pre-fetch command, and a Memory Read command.

While the present invention has been particularly described with reference to FIGS. 1 through 4, and with emphasis on certain buses and bandwidths, it should be understood that the figures are for illustration only and should not be taken as limitations upon the invention. In particular, while the present invention has been described and illustrated through peripheral agent accesses of a "main memory," the present invention can readily be implemented with accesses of any address space on a bus to which the peripheral bus is coupled through the use of a bridge. In addition, the use of the term "peripheral bus" should not be taken as a limitation on the type of bus to which the present invention can be applied. It is further contemplated that many changes and modifications may be made to the invention, by one of ordinary skill in the art, without departing from the spirit and scope of the invention as disclosed herein.

We claim:

1. A computer system comprising:

a memory;

an agent sending a plurality of write commands, wherein each write command is one of a first type and a second type; and a bus bridge coupled to the agent and to the memory, the bus bridge being operative to respond to write commands based on type, the bus bridge responding to receiving a first write command of the first type from the agent by storing a first data element of the first write command, and then the bus bridge responding to receiving a second write command of the second type from the agent by first transferring any data elements stored by the bus bridge in response to write commands of the first type to the memory and subsequently transferring a second data element of the second write command to the memory.

2. The computer system of claim 1 wherein the bus bridge sends an acknowledgment signal to the agent after transferring the second data element to the memory.

3. A computer system comprising:

a memory;

an agent sending a plurality of write commands, wherein each write command is one of a first type and a second type;

a bus bridge coupled to the agent and to the memory, the bus bridge being operative to respond to write commands based on type, the bus bridge responding to receiving a first write command of the first type by storing a first data element of the first write command, the bus bridge responding to receiving a second write command of the second type by first transferring any data elements stored by the bus bridge in response to write commands of the first type to the memory and subsequently transferring a second data element of the second write command to the memory, wherein the bus bridge sends an acknowledgment signal to the agent after transferring the second data element to the memory; and a processor, the processor determining completion of data transfer by examining a predetermined location in the memory.

4. The computer system of claim 3 wherein the second write command stores the second data element in the predetermined location, the second data element having a value indicative of completion of data transfer from the agent to the memory.

5. A method of writing data from an agent to a device with an address space, said method comprising the steps of:

the agent sending a plurality of write commands to a bus bridge, each of the commands being one of a first type of write command and a second type of write command that is used as the last write command in a transfer of data elements, wherein the first type of write command indicates that any data element specified by the first type of write command is to be stored by the bus bridge, and wherein the second type of write command indicates that any data elements stored by the bus bridge in response to receiving write commands of the first type from the agent are to be transferred to the device first and that any data element specified by the second write command is to be subsequently transferred; and the bus bridge responding to each write command based on type.

6. The method of claim 5 further comprising the step of the bus bridge sending an acknowledgment signal to the agent to indicate completion of a data transfer from the agent to the device.

7. A method of writing data from an agent to a device with an address space, said method comprising the steps of:

the agent sending a plurality of write commands to a bus bridge, each of the commands being one of a first type of write command and a second type of write command, wherein the first type of write command indicates that any data element specified by the first type of write command indicates that any data elements stored by the bus bridge in response to receiving write commands of the first type from the agent are to be transferred to the device first and that any data element specified by the second write command is to be subsequently transferred;

the bus bridge responding to each write command based on type; and determining completion of a data transfer from the agent to the device by examining a location in a memory.

8. The method of claim 7 further comprising the step of the memory receiving the second data element in the memory, the memory writing the second data element in the location wherein the second data element comprises a value indicative of completion of data transfer from the agent to the device.

9. A computer system comprising:

a first bus;

a processor coupled to the first bus;

a memory coupled to the first bus;

a second bus;

an agent coupled to the second bus, the agent being operative to send a first type of write command and a second type of write command, wherein the first and second types of write commands each include data to be written to the memory, wherein the second type of write command is used as the last write command in a transfer of data; and a bus bridge coupled the first bus and the second bus and coupled to receive write commands from the agent, the bus bridge being operative to respond to the first type of write command by storing data included in the first type of write command, the bus bridge being operative to respond to the second type of write command by first transferring any data stored by the bus bridge in response to the first type of write command to the memory and by subsequently transferring data specified by the second type of write command to the memory.

10. The computer system of claim 9, wherein the bus bridge is further operative to send an acknowledge signal to the agent in response to transferring data specified by the second type of write command to the memory, the agent being operative to inform the processor that data transfer to the memory is complete in response to the acknowledge signal.

11. A computer system comprising:

a first bus;

a processor coupled to the first bus;

a memory coupled to the first bus;

a second bus;

an agent coupled to the second bus, the agent being operative to send a first type of write command and a second type of write command, wherein the first and second types of write commands each include data to be written to the memory: and a bus bridge coupled the first bus and the second bus and coupled to receive write commands from the agent, the bus bridge being operative to respond to the first type of write command by storing data included in the first type of write command, the bus bridge being operative to respond to the second type of write command by first transferring any data stored by the bus bridge in response to the first type of write command to the memory and by subsequently transferring data specified by the second type of write command to the memory, and wherein the second write command stores data having a value indicative of completion of data transfer in a predetermined location of the memory, the processor determining completion of data transfer by examining the predetermined location of the memory.

12. A computer system comprising:
a first bus;
a processor coupled to the first bus;
a memory coupled to the first bus;
a second bus;
an agent coupled to the second bus, the agent being operative to send a first type of read command and a second type of read command, the first and second types of read commands specifying an address of the memory from which data is to be read; and
a bus bridge coupled the first bus and the second bus and coupled to receive read commands from the agent, the bus bridge being operative to respond to the first type of read command by fetching data from the address of the memory and from a first number of additional addresses of the memory and by storing the data in a data buffer, the bus bridge being operative to respond to the second type of read command by fetching data from the address of the memory and from a second number of additional addresses of the memory, wherein the first number of additional addresses is equal to at least one and exceeds the second number of additional addresses.

13. The computer system of claim 12, wherein the second number of additional addresses is equal to zero.

14. The computer system of claim 12, wherein the second number of additional addresses exceeds zero.

15. A computer system, comprising:
a first bus;
a processor coupled to the first bus;
a memory coupled to the first bus;
a second bus;
an agent coupled to the second bus, wherein the agent is capable of sending a first read command and a second read command that are each used to read data from the memory; and a bus bridge coupled to the first bus and the second bus, and also coupled to receive a plurality of read commands from the agent, the bus bridge responding to the first read command by reading a first memory address space and pre-fetching additional sequential data to the first memory address space, the bus bridge responding to the second read command by reading a second memory address space without pre-fetching any data.

16. A computer system, comprising:
a first bus;
a processor coupled to the first bus;
a memory coupled to the first bus;
a second bus;
an agent coupled to the second bus, wherein the agent is capable of sending a first read command and a second read command that are each used to read data from the memory; and
a bus bridge coupled to the first bus and the second bus, and also coupled to receive a plurality of read commands from the agent, the bus bridge responding to the first read command to read more than a full cache line from the memory by pre-fetching a predetermined number of additional cache lines, the bus bridge responding to the second read command to read less than a full cache line from the memory by pre-fetching one cache line of data, and wherein the computer system can support variable cache length pre-fetching.

17. The computer system of claim 16, wherein the predetermined number of addition cache lines is a number greater than one.

* * * * *